Dec. 21, 1965 W. L. MORGAN ETAL 3,224,843
SEPARATION OF CRYSTALS FROM A BORIC ANHYDRIDE MATRIX
Filed June 30, 1960 2 Sheets-Sheet 1

WILLARD L. MORGAN &
LEWIS F. SCHEFFLER
INVENTORS

BY
ATTORNEYS

Dec. 21, 1965  W. L. MORGAN ETAL  3,224,843
SEPARATION OF CRYSTALS FROM A BORIC ANHYDRIDE MATRIX
Filed June 30, 1960  2 Sheets-Sheet 2

WILLARD L. MORGAN &
LEWIS F. SCHEFFLER
INVENTORS

BY
ATTORNEYS 3,224,843
SEPARATION OF CRYSTALS FROM A BORIC
ANHYDRIDE MATRIX
Willard L. Morgan and Lewis F. Scheffler, Newark, Ohio, assignors to Owens-Corning Fiberglas Corporation, a corporation of Delaware
Filed June 30, 1960, Ser. No. 40,013
3 Claims. (Cl. 23—299)

This invention relates to the separation of crystals from a matrix and more particularly to the extraction of crystalline fibers or particles from a solid matrix comprising boric anhydride.

Crystalline fibers each constituting a single crystal have been found to be extremely strong and can be of a highly refractory nature. Such fibers have many uses including high temperature insulation applications and high strength reinforcement for cements, plastic materials, etc. Quantities of relatively long fibers constituting single crystals have been made of titania, zirconia, and zircon by a process disclosed in a copending application of Russell, Morgan and Scheffler filed on or about May 26, 1960. While this process is very effective for producing both relatively long and relatively short crystalline fibers, the extraction of such fibers from a matrix material in which they are formed has been rather slow and difficult. Of many solvents tried, hot water has been found to be the most effective for dissolving the matrix, which usually comprises boric anhydride and soda, from around the crystals embedded therein. Although hot water is effective for removing the matrix, it has been found that simply placing the body of matrix and crystals in a hot water bath is insufficient for the extracting process, this being too slow for use in the production of the crystals or crystalline fibers in any reasonable quantities.

It is believed that the relatively long time required to remove the matrix from the crystals is caused by certain compounds which form on the surfaces of the matrix when contacted by the hot water. These compounds tend to keep the hot water and matrix separated, thereby reducing greatly the rate at which the hot water dissolves the matrix. Accordingly, it has been found that the extracting process can be greatly shortened by subjecting the crystal and matrix body to a forceful stream of the hot water which causes the compounds formed on the surfaces of the body to be washed away and thereby enables the hot water to attack directly the matrix. It has also been discovered that certain acids can be used with the hot water, which acids remove the compounds to clear the way for the water to contact directly the matrix.

Further, in accordance with the invention, a continuous extracting technique has been devised by means of which most of the crystal-forming material employed in the original melt from which the crystals and matrix were made is recovered and re-used, thereby decreasing the cost of the overall process and maintaining material losses at a minimum. By recovering the crystal-forming materials from the hot water, the water can also be re-used.

It is, therefore, a principal object of the invention to provide an improved extracting process for separating crystals from a matrix.

Another object of the invention is to provide an extracting process by means of which a matrix material comprising boric anhydride can be separated more rapidly from crystalline particles or fibers embedded therein.

A further object of the invention is to provide an improved extracting process for separating crystalline particles or fibers from a matrix by means of which process substantial quantities of materials are recovered for re-use.

Other objects and advantages of the invention will be apparent from the following detailed description of preferred embodiments thereof, reference being made to the accompanying drawings, in which.

Figure 1:
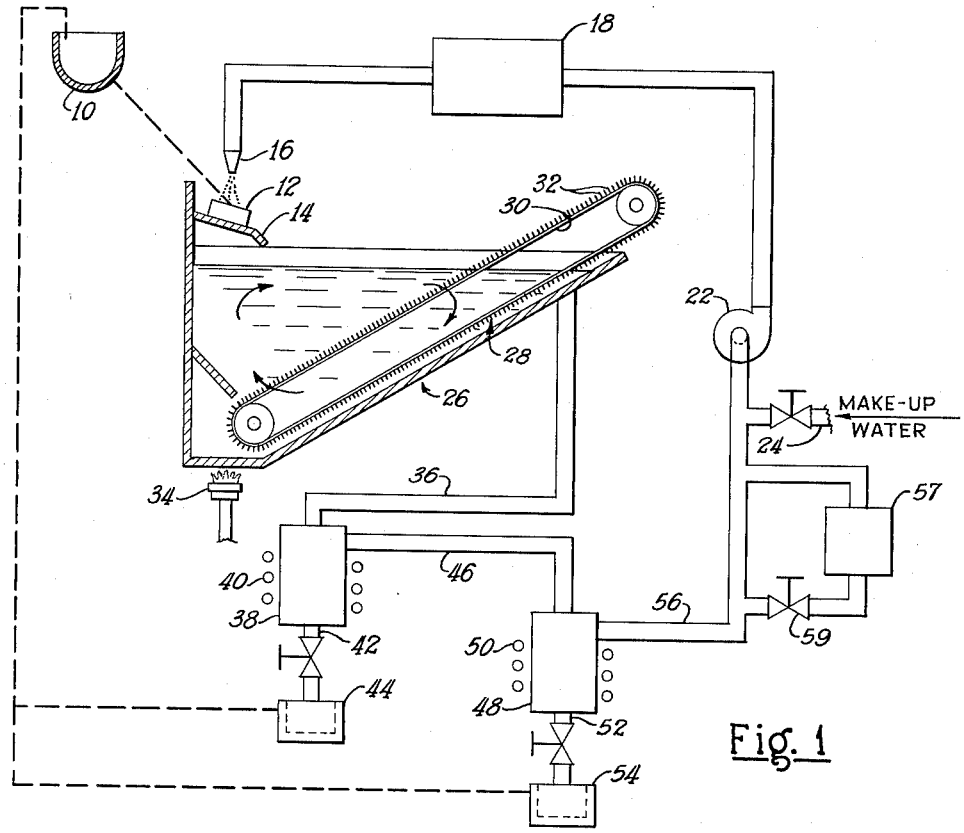
FIG. 1 is a schematic view of extracting apparatus for practicing the process according to the invention, and wherein a cooling technique is employed to separate remaining crystal-forming material and matrix from the water.

Referring to the drawings and more particularly to FIG. 1, a melter 10 is used to melt a crystal-forming material and matrix from which crystalline fibers or particles are made. A crystal-forming material such as titania, zircon, or zirconia and a matrix comprising borax, boric acid, or both, both being preferred, are heated in the melter 10 according to a technique disclosed in the aforesaid patent application of Russell et al. After the heat-treatment, the materials are cooled to ambient temperature resulting in crystalline fibers and a hardened matrix comprising boric anhydride. Soda in the form of a borate is also present in the hardened matrix when used in the batch, usually in the form of borax. Other alkali metal oxides in addition to soda can be used, the chief purpose of the oxide being to increase the solubility of the titania in the boric anhydride. The fibers then must be separated from the hardened matrix in order for them to be used separately as high temperature insulation or as reinforcement for various materials, for example, as previously discussed. It is this aspect of crystal production to which the present invention is directed.

In the extracting process according to the invention, a stream of hot water is directed on the body comprising the crystals and matrix to decrease substantially the length of the extracting time. The use of a stream of hot water has been found to be unexpectedly advantageous by comparison with a hot water bath, apparently because a gel forms on the surface of the body because of a reaction between the hot water and the boric anhydride and titania, which gel keeps the hot water in a bath from contacting the matrix. This gel apparently is either a hydrous gel of metatitanic acid or a hydroxide of titania. In any case, the hot water stream continuously washes away the gel and thus enables continuous contact between the matrix and the hot water. To accomplish this, a body 12 of crystals and matrix taken from the melter 10, as indicated by a dotted line, is placed on a support 14 under a nozzle 16 which preferably directs a plurality of hot water streams on the body 12. It has been found that the hot water is more effective if the body 12 is placed at an angle to the path of the hot water streams. In a preferred form, the included angle between the path and the body 12 is approximately 60°. Hot water is supplied to the nozzle 16 from a heater 18, through a pipe 20, and by a pump 22. A supply line 24 is provided for make-up water. The hot water, dissolved boric anhydride, crystalline fibers or crystals, and crystal-forming material which did not crystallize drain from the support 14 into an extraction tank 26, the crystals slowly settling to a bottom portion of the tank from which they are carried upwardly and outwardly by a conveyor 28. The conveyor 28 is shown as a belt- or chain-type conveyor including a belt 30 having a multiplicity of fingers 32 extending upwardly therefrom to catch the crystals and remove them from the tank. The belt 30 is preferably moved in an oscillatory manner so that the fibers thereon are provided with continuous motion relative to the hot water in the tank 26. The hot water is maintained at an elevated temperature by a source of heat at the bottom of the tank 26, represented by a burner 34. By virtue of the indicated positioning of the heat source, the liquid flows in a generally clockwise manner, as indicated by the arrows, and provides a flow counter-current to the direction of movement of the crystals, thereby to aid in removing any remainnig matrix material which may still be on the crystals at this time.

The liquid which includes the hot water, crystal-forming material, and boric anhydride, along with the borate of soda or other alkali metal oxide, if used, is removed from the tank 26 through a drain pipe 36. Much of the boric anhydride and borate are dissolved in the water although some usually is in suspension therein. The crystal-forming material, as crystals, or non-solubilized powder, or as a precipitate from the gel, is insoluble and is in suspension in the water. The drain pipe 36 carries the liquid to a first tank 38 in which the liquid is cooled approximately to room temperature by means of a coolant such as water passed through a coil 40. Cooling by the coil 40 lowers the solubility of the boric anhydride, and the alkali metal borate, which settle to the bottom of the tank 38 along with much of the crystal-forming material. These materials then may be removed through a first drain line 42, collected in a first receptacle 44, and carried back when dry to the melter 10, as indicated by dotted lines. Suitable conveying means can be substituted for the receptacle 44, if desired. The water and the remaining materials, most of which are in solution but some of which may be in suspension, are then carried through a connecting pipe 46 to a second tank 48 in which the water and remaining materials are further cooled, preferably to a temperature of about 40° F., e.g. by means of a refrigerant, passed through a coil 50. The further cooling causes additional materials to come out of solution and to settle to the bottom of the tank 48 from which they are removed by a second drain line 52. These materials can be collected in a second receptacle 54 and carried back to the tank 10, as indicated by dotted lines. The water, now substantially free from crystal-forming material, and low in concentration of boric anhydride and any alkali metal borate, is then carried through a return line 56 back through the heater 18, the pipe 20, the pump 22 and the nozzle 16 for re-use. If the crystalline fibers are given a final wash by water supplied at the upper end of the conveyor 28, excess water may result in the system. Such water can be removed by an evaporator 57 parallel to the line 56 with a control valve 59 for regulating flow therethrough.

From the above discussion it will be apparent that the extracting process according to the invention enables full use of substantially all materials employed in the crystal-producing techniques. Thus, the crystal-forming material is either formed into crystals which are gathered at the end of the conveyor 28 or is separated from the water and re-used in the melter 10. The boric anhydride from the boric acid, borax, or both, and any alkali metal borate employed, are also recovered from the water and re-used in the melter 10. Small losses do occur, however, because some of the materials vaporize (about 1%) during the heat-treating operation and some remain in solution in the water, the amount being affected by the solubility of the materials in the water, which depends upon the temperature to which the water is cooled in the tanks 38 and 48. The water also is re-used, except for that which is lost by evaporation.

Figure 2:
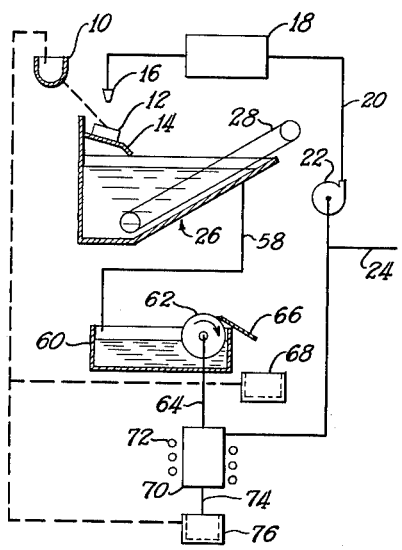
FIG. 2 is a diagrammatic view of modified extracting apparatus for practicing the process according to the invention, a combined mechanical separation and cooling technique being used to separate crystal-forming material and matrix from the water.

A modified extracting technique is illustrated in FIG. 2. The apparatus there shown includes the melter 10, the body 12, the support 14, and the tank 26. The nozzle 16, the heater 18, the pipe 20, the pump 22, and the supply pipe 24 are also similar to the corresponding components of FIG. 1. The difference lies in the method of separating the hot water from the remaining crystal-forming material, boric anhydride, and any alkali metal borate, which is accomplished in part by a mechanical method of separation. The liquid comprising the water and the above materials which are in both solution and suspension, are carried out a drain pipe 58 to a shallow container 60 in which is partially immersed a suction drum 62 which can be of the Oliver-type, as is known in the art. Means (not shown) are provided to rotate the drum in a clockwise manner, as shown by the arrow, and means (not shown) are provided to establish a suction within the drum. As the drum 62 rotates in the liquid in the container 60, it draws the liquid through the surface of the drum and out a connecting line 64 communicating with the center of the drum. Particles in suspension in the liquid are caught on the periphery of the drum 62 and are removed by a scraper 66, the materials then being collected in a suitable receptacle 68. These materials, which include either unused and precipitated crystal-forming material, or such with boric anhydride and any metal borate, are then returned to the melter 10, as indicated by dotted lines. Although the drum 62 will remove particles in suspension in the water, it will not remove particles in solution. Because it is necessary to remove such particles in order to enable the water to dissolve additional matrix when again sprayed on the body 12, the water and remaining materials are supplied to a tank 70 which is cooled by a coolant passed through a coil 72 in order to decrease the solubility of the materials in the water and cause them to settle in the bottom of the tank 70 from which they can be removed by a drain line 74. The materials are collected in a suitable receptacle 76 and are returned when dry to the melter 10, as indicated by dotted lines.

Figure 3:
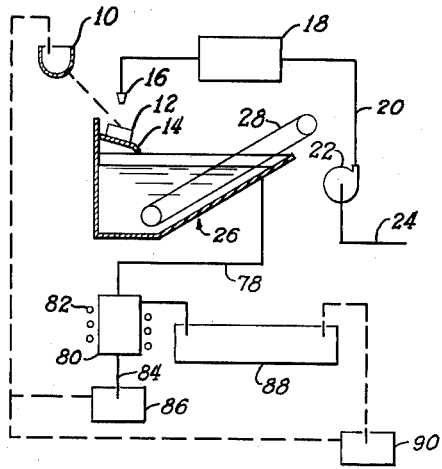
FIG. 3 is a diagrammatic view of another modified extracting apparatus for practicing the process, where a combined cooling and evaporating technique is employed to separate crystal-forming material and matrix from the water.

In locations where water is relatively inexpensive, it may be desired to employ less expensive equipment and not return the water to the extracting tank. Apparatus suitable for this purpose is shown in FIG. 3, this apparatus including the tank 10, the body 12, the support 14, the nozzle 16, the heater 18, the line 20, the pump 22, the water supply pipe 24, and the extracting tank 26. Liquid from the tank 26 is carried through a drain pipe 78 to a tank 80 which is cooled by a coolant passed through a coil 82. Part of the materials in the liquid settle in the tank 80 as the liquid is cooled and are removed by a drain line 84 from which they are collected in a suitable receptacle 86 and carried back ot the melter 10, as indicated by dotted lines. The liquid and remaining materials are then supplied to a large, open evaporating tank 88 or multiple-effect evaporator (not shown) from which the water is evaporated and the remaining materials are gathered in a receptacle 90 and returned to the tank 10, as indicated by dotted lines. This system eliminates the need for the second cooling tank and any refrigeration apparatus associated therewith, but because the water is evaporated, fresh water must always be supplied to the nozzle 16.

Figure 4:
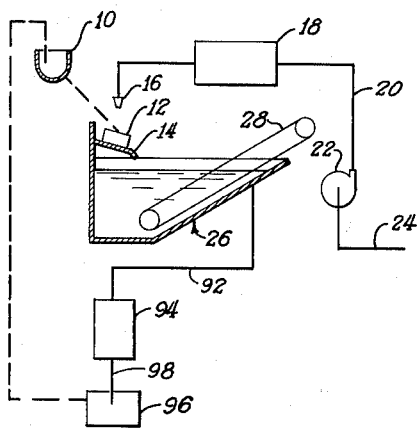
FIG. 4 is a diagrammatic view of further modified extracting apparatus for practicing the process, a drying technique being employed for separating the crystal-forming material and matrix from the water.

FIG. 4 also shows modified apparatus by means of which materials in the hot water can be removed and re-used but from which the water is evaporated. The water supply system and the extracting tank 26 are similar to the corresponding components in FIGS. 1–3. In this instance, the liquid comprising water and the crystal-forming materials, boric anhydride, and any alkali metal borate are removed from the tank 26 through a drain pipe 92 and carried to a dryer 94 from which the water is driven off as a vapor, leaving the other materials for collection in a receptacle 96 from a drain line 98 and for return to the melter 10, as indicated by a dotted line. This extracting apparatus thus is similar to that of FIG. 3 except that heat is used to drive off the water.

Figure 5:
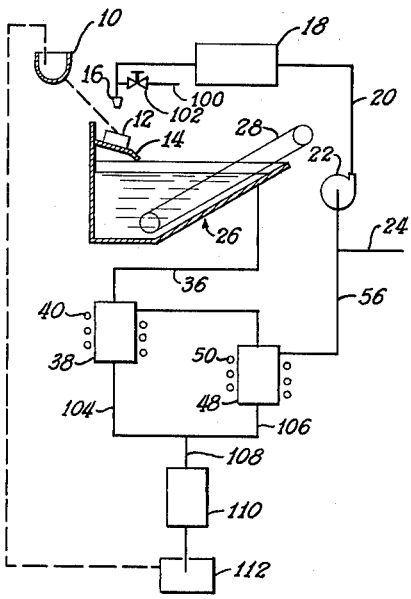
FIG. 5 is a diagrammatic view of still further modified extracting apparatus, where a cooling and heating technique is used to separate crystal-forming material and matrix from the water and also to separate acid from the water.

FIG. 5 shows further extracting apparatus which is particularly useful when a weak acid is employed with the hot water streams. Oxalic, tartaric, lactic, and citric acids are particularly suitable, these acids removing the gel on the surfaces of the body 12, apparently formed by precipitation. The water system in the apparatus of FIG. 5 is similar to those of the previous figures except that an acid supply pipe 100 is employed just upstream of the nozzle 16 to add a weak acid to the hot water issuing from the nozzle 16. A valve 102 is located in the pipe 100 to regulate the amount of acid so added. Liquid including hot water, acid, and materials from the crystal-forming batch are removed from the tank 26 through the drain pipe 36 and the crystal-forming batch materials are separated from the water and uncombined acid in the cooling tanks 38 and 48, the water and acid being returned to the nozzle 16. In this instance, the solids from the tanks 38 and 48, which include matrix material, crystal-forming material, and the acid in combined form are then delivered through lines 104, 106 and 108 to an oven 110 in which the acid is driven off, as $CO_2$ and water when the preferred oxalic acid is used. The remaining solids are then collected in a receptacle 112 and returned to the melter 10, as indicated by dotted lines. The combined acid can also be separated by flowing the water solution or suspension through a suitable column in contact with an anion exchanger, e.g., where the anion exchanger may be a substituted polymeric benzyl amine and the reactive substituents of the molecule have one of the following formulae: [1]

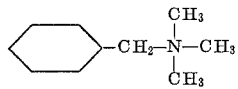

and

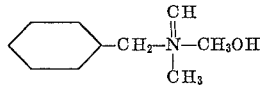

Figure 6:
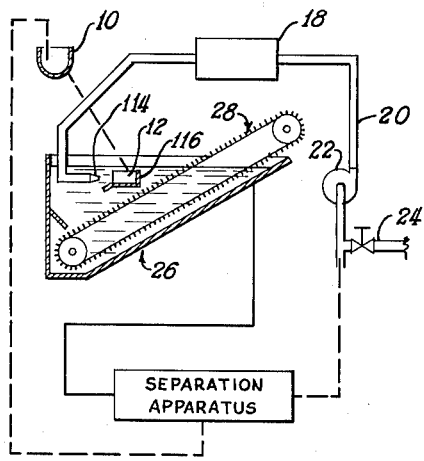
FIG. 6 is a diagrammatic view of yet another modified extracting apparatus in which a nozzle is located in a different position.

Referring to FIG. 6, extracting apparatus therein shown is similar to that of FIGS. 1–5 except that a nozzle 114 is positioned under the surface of the liquid in the tank 26, which liquid comprises the hot water, matrix material in solution and suspension, uncrystallized crystal-forming material, and minute crystals not carried off by the conveyor 28. A support 116 is positioned under the surface of the liquid near the nozzle 114 with the body 12 placed thereon. When hot water with or without the acid is emitted through the nozzle 114, it inspirates and carries with it against the body 12 some of the liquid in the tank 26. Particles of the matrix material and crystallized or uncrystallized crystal-forming material in this liquid provide an additional eroding or abrading force which further aids in the extraction process. The liquid from the tank 26 then can be passed through suitable separation apparatus, as shown in FIGS. 1–5, and the water recirculated, as indicated by a dotted line, when not evaporated or driven off. The matrix and crystal-forming materials are also carried back to the melter 10, as indicated by a dotted line.

The body 12 has been made according to the following process. A six pound charge made up of equimolecular proportions of titania ($TiO_2$), boric anhydride ($B_2O_3$) and borax ($Na_2B_4O_7$), was heated to and held at 2450 to 2500° F. for a period of approximately one-half hour in a gas-fired furnace, until the titania was thoroughly dissolved in, or formed a homogeneous liquid with, the boric acid and borax. The melt was then cooled by cooling the furnace at a rate of about 30° F. per minute to approximately 2300° F., which temperature was above the maximum for formation of either nuclei or crystals of $TiO_2$. The melt was then cooled at a slower rate by cooling the furnace at a rate of about 15° F. per minute to a temperature of about 2220° F., which is in the upper end of the range in which nuclei form, frequently termed the nucleation range. At this temperature a small crystal was visible in the melt. The temperature of the melt was then increased slightly, approximately 20° F., to about 2240° F. to decrease the number of nuclei formed and was then cooled at a slow rate of 2° F. per minute to cause the crystals to continue to grow primarily upon the few nuclei present without forming additional nuclei to any large extent. When a temperature of 1800° F. was reached, firing of the furnace was discontinued, and the melt was cooled to ambient temperature of about 70° F. The extraction process can be shortened by removing part of the matrix from the crystals while still hot, preferably at a temperature of about 1700–1800° F. This can be accomplished by turning over the melter 10, the matrix material being sufficiently fluid in this temperature range to enable part of it to flow from the melter while the crystals remain therein. A large drain hole can be provided in the bottom of the melter 10 for a similar purpose, the hole being opened when the melt is cooled to a temperature from 1700–1800° F. to enable part of the matrix material to drain therethrough.

Various modifications of the above described embodiments of the invention will be apparent to those skilled in the art and it is to be understood that such modifications can be made without departing from the scope of the invention if within the spirit and tenor of the accompanying claims.

We claim:

1. A method of producing crystal fibers selected from the group consisting of titania, zirconia, and zircon with the aid of a matrix comprising boric anhydride, which method comprises heating the crystal-forming material and the matrix material in a melter to melt the matrix material and to dissolve the crystal-forming material therein, cooling the resulting melt to reduce the solubility of the crystal-forming material and to cause crystal fibers to form and grow in the matrix, subsequently draining the matrix from the melter and the resulting crystal fibers after substantially as much of the crystal-forming material as possible has come out of solution and while the melter, the crystal fibers, and the matrix are still at an elevated temperature and the matrix is still in liquid form, removing the crystal-forming material and remaining matrix from the melter, effecting relative movement between hot water and said crystal fibers and remaining matrix to cause said hot water to dissolve said matrix and to wash away any compound formed thereon, and subsequently separating the water from the crystal fibers.

2. A method of producing crystal fibers selected from the group consisting of titania, zirconia, and zircon with the aid of a matrix comprising boric anhydride, said method comprising heating the crystal-forming material and matrix material in a melter to melt the matrix material and to dissolve the crystal-forming material therein, cooling the resulting melt to reduce the solubility of the crystal-forming material in the matrix material and to cause crystal fibers to form therein, draining the matrix from the melter and resulting crystals when at least a substantial amount of the crystal-forming materials have come out of solution and when the melt is still at an elevated temperature and the matrix is still in a liquid

---

[1] See Dowex: Iron Exchange, The Dow Chemical Company, Midland, Michigan, 1958, pages 4 and 5.

condition, removing the crystal fibers and remaining matrix from the melter, effecting relative movement between hot water and said crystal fibers and remaining matrix to cause said hot water to dissolve the remaining matrix and to wash away any compound formed thereon, and subsequently separating the water from the crystal fibers.

3. A method of producing crystal fibers selected from the group consisting of titania, zirconia, and zircon with the aid of a matrix comprising boric anhydride which comprises heating the crystal-forming material and a matrix material in a melter to melt the matrix material and to dissolve the crystal-forming material therein, cooling the resulting melt to reduce the solubility of the crystal-forming material and to cause crystal fibers to form and grow in the matrix, draining the matrix from the melter and resulting crystals when at least a substantial amount of the crystal-forming material have come out of solution and when the melt is still at an elevated temperature and the matrix is still in a liquid condition, effecting relative movement between the crystals and remaining matrix and a combination of hot water and an acid selected from the group consisting of oxalic, citric, tartaric, and lactic acids to cause said hot water and said acid to dissolve said matrix and to remove any compound formed thereon.

References Cited by the Examiner
UNITED STATES PATENTS

| | | | |
|---|---|---|---|
| 1,883,262 | 10/1932 | Woodward | 23—312 |
| 2,469,088 | 5/1949 | Thompson | 23—59 XR |
| 2,906,605 | 9/1959 | Dubeck | 23—204 |
| 2,967,088 | 1/1961 | Peters | 23—312 XR |
| 2,972,521 | 2/1961 | Voos | 23—311 XR |
| 3,011,868 | 12/1961 | Moore | 23—295 XR |
| 3,065,091 | 11/1962 | Russel et al. | 23—202 XR |
| 3,079,240 | 2/1963 | Remeika | 23—295 XR |

OTHER REFERENCES

Mellor: Comprehensive Treatise of Inorganic and Theoretical Chemistry, vol. 5, pp. 41 to 58. (Copy in Group 110.)

NORMAN YUDKOFF, *Primary Examiner.*

GEORGE D. MITCHELL, *Examiner.*